(12) United States Patent  (10) Patent No.: US 9,171,389 B2
Roumier et al.  (45) Date of Patent: Oct. 27, 2015

(54) METHOD FOR PLANNING DIGITAL IMAGES TO BE PRINTED ON A ROLL OF MEDIA

(71) Applicant: OCE-TECHNOLOGIES B.V., Venlo (NL)

(72) Inventors: Valerie Roumier, Creteil (FR); Helene Danlos, Paris (FR)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/502,394

(22) Filed: Sep. 30, 2014

(65)  Prior Publication Data
US 2015/0093049 A1  Apr. 2, 2015

(30)  Foreign Application Priority Data

Oct. 1, 2013 (EP) .................................... 13306361

(51) Int. Cl.
 *G06T 11/60* (2006.01)
 *G06K 15/02* (2006.01)
 *G09G 5/14* (2006.01)
 *G06F 3/048* (2013.01)
 *G06F 3/12* (2006.01)

(52) U.S. Cl.
 CPC ............. *G06T 11/60* (2013.01); *G06F 3/048* (2013.01); *G06F 3/1205* (2013.01); *G06F 3/1207* (2013.01); *G06F 3/1251* (2013.01);
 (Continued)

(58) Field of Classification Search
 CPC ..... G06F 3/048; G06F 3/1205; G06F 3/1207; G06F 3/1251; G06F 3/1256; G06F 3/1259; G06F 3/1282; G06K 15/022; G06K 2215/0097; G06T 11/60; G09G 2354/00; G09G 5/14; G03B 2227/005
 See application file for complete search history.

(56)  References Cited

U.S. PATENT DOCUMENTS 5,369,426 A * 11/1994 Jamzadeh ............... G03G 15/01
 347/115
6,072,596 A *  6/2000 Hattori ................... G03B 27/588
 358/401
(Continued)

FOREIGN PATENT DOCUMENTS

EP  1 895 400 A2  3/2008
EP  2 031 499 A2  3/2009
(Continued)

*Primary Examiner* — Jingge Wu
(74) *Attorney, Agent, or Firm* — Birch, Stewart, Kolasch & Birch, LLP

(57)  ABSTRACT

A method for displaying a plurality of individual digital images to be printed on a roll of media includes constructing a composed digital image representing the roll and including a plurality of representations of the individual digital images to be printed on the roll in a sequence order corresponding to the time sequence order of printing the plurality of individual digital images on the roll, constructing a time line along the composed digital image, the time line indicating a start time and/or a completion time and/or a time duration of the printing of an image of the plurality of individual digital images on the roll, and displaying at least a part of the composed digital image on the user interface. The composed digital image is scrollable on a user interface in order to scroll through the plurality of representations of the individual digital images, and each displayed representation of an individual digital image of the composed digital image is displayed wholly along a part of the time line, which part starts at the start time of printing of the individual digital image on the roll and ends at the completion time of printing of the individual digital image on the roll. A printing system is configured to apply the method.

15 Claims, 11 Drawing Sheets

(52) U.S. Cl.
CPC ............ *G06F3/1256* (2013.01); *G06F 3/1259* (2013.01); *G06F 3/1282* (2013.01); *G06K 15/022* (2013.01); *G09G 5/14* (2013.01); *G06K 2215/0097* (2013.01); *G09G 2354/00* (2013.01)

(56) References Cited

U.S. PATENT DOCUMENTS

| | | | | |
|---|---|---|---|---|
| 6,362,868 | B1* | 3/2002 | Silverbrook | ......... H04N 5/2628 347/86 |
| 2003/0117496 | A1* | 6/2003 | Silverbrook | ......... B41J 2/14427 348/207.2 |
| 2014/0327939 | A1* | 11/2014 | Hermus | ................... H04N 1/46 358/448 |
| 2014/0362134 | A1* | 12/2014 | De Grijs | .............. B41J 11/0065 347/9 |

FOREIGN PATENT DOCUMENTS

| | | |
|---|---|---|
| EP | 2 431 861 A2 | 3/2012 |
| JP | 2012-033055 A | 2/2012 |
| WO | WO 01/16652 A1 | 3/2001 |

\* cited by examiner

METHOD FOR PLANNING DIGITAL IMAGES TO BE PRINTED ON A ROLL OF MEDIA

CROSS-REFERENCE TO RELATED APPLICATIONS

This application claims priority under 35 U.S.C. §119(a) to Application No. 13306361.0, filed in Europe on Oct. 1, 2013, the entire contents of which is hereby incorporated by reference into the present application.

BACKGROUND OF THE INVENTION

1. Field of the Invention

The present invention relates to a method for planning a plurality of individual digital images to be printed on a roll of media, the method comprising the step of constructing a composed digital image representing the roll and comprising a plurality of representations of the individual digital images to be printed on the roll in a sequence order corresponding to the time sequence order of printing the plurality of individual digital images on the roll.

2. Description of Background Art

Nowadays printing systems are available for printing images consuming consumables like toner, ink, paper or other media. Printing systems for printing images on a roll usually have a planning system comprising a print queue of print jobs. However, the operator has no clear overview on when to plan intervention on reloading consumables. Therefore he has to check the status of the printing system very often. The operator also has no clear overview of how to optimize the printer usage depending on the jobs. Such an overview is necessary when overnight printing is unattended.

A preview of an image to be printed may be provided via a printer driver. However, the operator also has no clear overview of how to make sure that print jobs are actually printed at the right time, for example if there is a deadline for a specific print job. When a printing system is capable of printing at different print velocities, planning in time becomes more difficult. Furthermore, changing of a roll depends on how many print jobs can be planned for a certain roll of media.

The term print velocity for an individual digital image to be printed on the roll is defined as the distance of the printed image on the roll in the length direction of the roll on which the individual digital image is going to be printed divided by the total time it takes from the beginning of the printing of the individual digital image to the completion of the printing of the individual digital image.

The print velocity as defined here-above is determined by the velocity of the media unwound from the roll along the print head of the printing system. The print velocity may also be determined by the jet frequency of recording material in case of an inkjet printing system. If the printing system is a multi-pass printing system, the print velocity is also dependent on the number of passes to cover part of the media. A printing system capable of printing images at a plurality of print velocities may be envisioned when print strategies based on a different number of passes is applied to the printing process.

The print velocity at which an individual digital image is going to be printed may be derived from print job specifications of a print job to which the individual digital image belongs, like a print mode setting, or from a property of the individual digital image like black-and-white print mode, a color print mode, a full color print mode, a CAD/GIS print mode, etc.

When print jobs are printed on a roll and the roll has been fully printed and wrapped up, it is difficult for the operator to have an overview of the images which have been printed on the roll.

SUMMARY OF THE INVENTION

It is an object of the present invention to facilitate an easier way of planning print jobs to be printed on a roll of media and of having an overview of images which have been printed on the roll.

According to an embodiment of the present invention, this object is achieved by a method according to the preamble, wherein the method comprises the further steps of constructing a time line along the composed digital image, the time line indicating a start time and/or a completion time and/or a time duration of the printing of an image of the plurality of individual digital images on the roll, and displaying at least a part of the composed digital image on the user interface, wherein the composed digital image is scrollable on a user interface in order to scroll through the plurality of representations of the individual digital images, and each displayed representation of an individual digital image of the composed digital image is displayed wholly along a part of the time line, the part of the time line starting at the start time of printing of the individual digital image on the roll and ending at the completion time of printing of the individual digital image on the roll.

The composed digital image delivers a preview of how individual digital images, for example submitted via print jobs or selected from an image pool, will actually be printed on the roll, for example by means of a roll-to-roll printing system or a printing systems for a roll having a built-in cutting device. The user can visually check the images to be printed on the roll. The user can also have an indication on the timing schedule by means of the time line, for example when a roll becomes fully printed upon. This helps the operator on deciding when to switch from one roll to another or to replace a roll, or on deciding to allocate some jobs to another roll to improve productivity or minimize waste of media.

The user or operator can check if there is enough media on the roll and/or he has enough print jobs scheduled for unattended printing of the whole roll.

The user interface may be a local user interface connected to the printing system or a remote user interface wireless connected to the printing system, like a mobile device, a tablet, a mobile phone, a smart phone, a smart watch, smart glasses, a notebook computer, a laptop computer or any other hand held device. The user interface may also be a part of a desktop computer connected to the printing system via a network system.

Each displayed representation of an individual digital image of the composed digital image is displayed along the whole part of the time line when it is intended to be printed, is being printed or has been printed. By doing so, it is immediately clear how much time the printing of the individual digital image will take, if the image still has to be printed. If the image has already been printed, it is immediately clear how much time is has taken to print the image on the roll. Before printing on the roll of media, the composed digital image comprises representations of individual digital images scheduled to be printed on the roll. During printing on the roll of media, the composed digital image data comprises representations of individual digital images that have already been printed on the roll, a representation of an individual digital image that is currently been printed on the roll, and representations of individual digital images that are still going to be printed on the roll in the very near future.

According to an embodiment, the representation of an individual digital image of the plurality of representations comprises the individual digital image. The representation of the individual digital image may comprise a digital image being the individual digital image scaled to the composed digital image in the width direction of the roll represented in the composed digital image and scaled to the time line in the length direction of the roll represented in the composed digital image. The representation of the individual digital image may also be a background image comprising a thumbnail image of the individual digital image on top of the background image.

According to an embodiment, the step of constructing the composed digital image comprises the step of displaying the plurality of individual digital images on the user interface, displaying the composed digital image under construction on the user interface, selecting an image from the plurality of individual digital images on the user interface, dragging and dropping the selected image onto the composed digital image on the user interface, adding a representation of the selected image to the composed digital image, and displaying the representation of the selected image in the composed digital image on the user interface screen. In this way, the constructing of the composed image becomes easy and user friendly. The user interface may be able to interpret movement of a mouse device or the user interface may be a touch user interface, which is capable of detecting gestures of the user on a touch screen like dragging or swiping.

According to an embodiment, the method comprises the further step of zooming out of the composed digital image and constructing the composed digital image by changing a representation of an individual digital image of the composed digital image into a representation comprising a thumbnail image of the individual digital image.

Zooming out may be applied to the time line, for example to double the time reach of the displayed time line. The thumbnail image may be placed on a background digital image which is displayed along the whole part of the time line when the individual digital image corresponding to the thumbnail image is intended to be printed, is currently being printed or has been printed.

According to an embodiment of the method, a representation of an individual digital image of the composed digital image is placed at a position with respect to the width of composed digital image, which position is in accordance with the position of the individual digital image on the roll with respect to the width of the roll when printed on the roll. The visualization gives a real impression of at what position with respect to the width of the roll the individual digital image will be printed or has been printed.

According to an embodiment, the method comprises a step of displaying near the composed digital image a numerical indication of the width of the roll. The width of the roll may be derived from a detected roll width of the roll, which is loaded in the printing system or from print job specifications comprising a specification of the type and dimensions of the media to be used, and/or a specification of the dimensions of the individual digital image to be printed. The numerical indication on the composed image may be useful for roughly estimating the length of an individual digital image when printed on the roll.

According to an embodiment of the method, the composed digital image comprises a set of individual digital images from the plurality of individual digital images, which set has already been printed on the roll. The history of printing on the roll in the composed digital image may be used when the completely printed roll has to be cut by a cutting device or has been cut by an inline cutting device of the printing system.

According to an embodiment, the method comprises the step of displaying an image item between two consecutive representations of the plurality of individual digital images along the time line, the image item indicating a user event for maintenance of a printing system by which the roll is printed. Such an image item may be an icon, a text image, a thumbnail image, etc. The image item may indicate a level of a consumable like ink, toner or any other recording material. The image item may also indicate the end of a roll of media. Since the image item is displayed along the time line, the operator immediately knows at what time the user event for maintenance should occur. The operator can operate efficiently by trying out several options when constructing the composed digital image along the time line. He can, for instance, check that there are enough consumables and print jobs for overnight printing, that the deadlines of specific jobs will be made and when intervention, for example roll change or replacement, is required.

According to a further embodiment, the two consecutive representations of the individual digital images belong to a same print job. In this way, it is assured that, for example ink consumables are also replenished during a print job such that print quality will not decrease during printing of the individual digital images of the print job.

According to another further embodiment, the method comprises the step of dragging and dropping the image item between representations of two consecutive individual digital images in the composed digital image.

The user interface may enable the dragging and dropping of such an image item at another position between representations of two other consecutive images in the composed digital image. The operator may do so taking the time moments at the time line into account. For urgent user events, the dragging and dropping may take place backward in time instead of forward in time.

According to an embodiment of the method, the time line is displayed as a line of linear time. In case of printing on the roll by means of one print velocity, the linear time line may be selected at such scale that the representations of the individual digital images are clearly distinguishable and in correct dimensions with respect to the displayed width of the roll in the composed digital image. In case of printing on the roll by means of more than one print velocity, the representations of the individual digital images may be stretched or shrunk in the length direction of the composed image in accordance with the print velocity. The time line is kept linearly along the individual digital images.

According to a further embodiment, the method comprises the step of shrinking an image of the plurality of representations of the individual digital images in the direction of the length of the composed digital image in accordance with a higher print velocity applied to the image when printed than the print velocity applied to the previous individual digital image.

According to another further embodiment, the method comprises the step of enlarging a representation of an image of the plurality of individual digital images in the direction of the length of the composed digital image in accordance with a lower print velocity applied to the image when printed than the print velocity applied to the previous individual digital image.

According to an embodiment, the aspect ratio of each displayed representation of an individual digital image in the composed digital image is equal to the aspect ratio of the individual digital image when printed on the roll. The composed digital image comprises each representation of an image of the plurality of individual digital images in dimensions that correspond to the width and length of the image when printed on the roll. In case of more than one print velocity used when printing the individual digital images, the representations of the individual digital images are still in correct scaled dimensions with respect to the images printed on the roll while the time line gets an a-linear course.

According to an embodiment, the method comprises the further steps of automatically registering the time period when printing an image of the plurality of individual digital images and adapting the composed digital image with respect to the printed image and the corresponding part of the time line in accordance with the registered time period. By doing the history part, the composed digital image corresponds exactly with the actual times when the individual digital images have been printed.

According to a further embodiment, the method comprises the further step of making a representation of an individual digital image of the composed digital image and a corresponding part of the time line along the composed digital image uneditable after printing the individual digital image on the roll. By doing so, the history part of the roll cannot be adapted anymore and stays in accordance with the printing moments in time like a start time and a completion time of an image that has been printed in the past.

According to an embodiment, the method comprises a step of setting a parameter of the start time of printing on the roll of media. This is advantageous when a part of the individual images are already dropped on the composed digital image, but the start time of the printing on the roll is shifted in time. The setting of the parameter may be enabled by means of a settings menu callable and displayable on the user interface.

According to an embodiment, the method comprises the further step of shrinking part of the time line and corresponding representations of images if the images are the same, and displaying a numerical indication of the number of same corresponding images. A print job may contain one individual digital image to be printed many times.

In order to ease scrolling through the composed digital image in the length direction of the composed digital image, a representation of the individual digital image as the first copy and a representation of the individual digital image as the last copy may be part of the composed digital image and representations of the copies between the first copy and the last copy may be suppressed. The time line may have a gap in time corresponding to the time it takes to print the in-between copies of the individual digital image. The gap may be visualized by a small space between the first copy and the last copy. The space may be used to display a numerical indication of the number of prints of the individual digital image, which are going to be printed or already have been printed.

According to an embodiment, the method comprises the further step of adding during printing on the roll an individual digital image to the plurality of individual digital images in the composed digital image corresponding to a part of the time line, which part represents a time period in the future for the individual digital image to be printed on the roll. The operator is able to add individual digital images that have been forgotten or are part of a new job, for example a rush job.

According to an embodiment, the method comprises the further step of reordering representations of the plurality of individual digital images on the composed digital image as composed as the images corresponding to the representations to be reordered are not printed yet on the roll. The reordering of representations of individual digital images may be helpful in time scheduling, for example when new deadlines of certain print jobs planned to be printed on the roll are introduced or changed. In case of a touch screen, the reordering may be established by dragging and dropping a representation of an individual digital image to be printed on the desired place in the composed digital image.

According to an embodiment, the method is applied to a further roll. Printing systems may contain a plurality of rolls. Printing may start on a first roll and continue on a second roll when the first roll is fully printed. An overview on the user interface screen may comprise a plurality of composed digital images constructed according to one of the embodiments of the invented method. Each composed digital image represents a specific roll. If printing on the rolls takes place subsequent in time, the composed digital images may be placed behind each other in order to scroll through more than one composed digital image and envisioning the change of rolls in time. When a change of a first roll to a second roll takes some time, for example since the first and second roll have to be positioned at the same position in the printing system, a time image item may be displayed between the representation of the last individual digital image on the first roll and the representation of the first individual digital image on the second roll.

According to an embodiment, the method comprises the further step of dragging and dropping an image of the plurality of individual digital images, which image has not yet been printed, onto the displayed composed digital image of the further roll in order to print the image on the further roll. This is in particular advantageous when a print job containing a plurality of individual digital images does not completely fit on one roll as indicated and visualized by the composed digital image of the roll. The individual digital images of the print job may be dragged and dropped onto the composed digital image representing another roll, which has more empty space left on the roll.

The present invention also relates to a non-transitory computer readable/recording medium comprising computer executable program code configured to instruct a computer to perform the method according to any of the embodiments of the method according to the present invention.

The present invention also relates to a printing system comprising a print engine to print a plurality of individual digital images on a roll of media, a user interface for displaying a plurality of representations of the individual digital images, a control unit to control the printing process and to control data transfer to the user interface, wherein the control unit comprises a first constructing device configured to construct a composed digital image representing the roll and comprising the plurality of representations of the individual digital images to be printed on the roll in a sequence order corresponding to the time sequence order of printing the plurality of individual digital images on the roll, the composed digital image being scrollable on the user interface in order to scroll through the plurality of representations of the individual digital images, a second constructing device configured to construct a time line comprised in the composed digital image, the time line indicating a start time and/or a completion time and/or a time duration of the printing of an image of the plurality of individual digital images on the roll, a determining device configured to determine at least a part of the plurality of individual digital images of the composed digital image and the corresponding part of the time line to be displayed on the user interface, wherein the construction of the composed digital image by the first constructing device and the construction of the time line by the second constructing device are such that each displayed representation of an individual digital image of the composed digital image is displayed wholly along a part of the time line, the part of the time line starting at the start time of printing of the individual digital image on the roll and ending at the completion time of printing of the individual digital image on the roll.

According to an embodiment of the printing system, the printing system is a roll-to-roll printing system. In a roll-to-roll printing system, media is unwound from a first roll, the media is printed upon by the print engine, and the printed media is rewound on a second roll. When the second roll is completely printed with all individual digital images that were scheduled to be printed, only the last image or even no image printed on the roll is visible for the operator. The user interface connected to the printing system can show all the images printed on the roll in the composed digital image. The composed digital image may be scrollable for fast tracking of an individual digital image to be printed or already printed on the second roll.

It may be clear for the skilled person that the previous embodiments of the printer system may be combined in one way or another resulting in embodiments which also fall under the scope of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
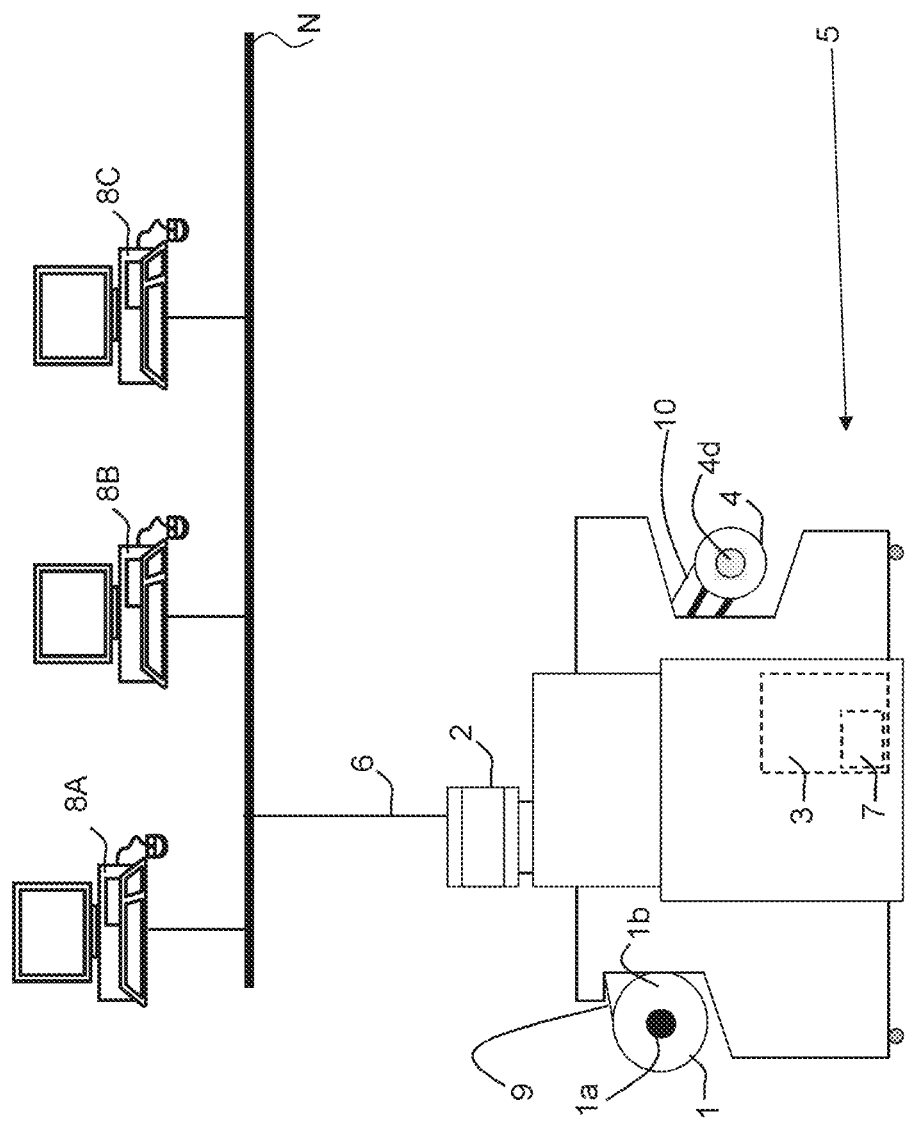
FIG. 1 schematically shows a print system in which the invented method is applicable.

The present invention will now be described with reference to the accompanying drawings, wherein the same or similar elements are identified with the same reference numerals throughout the several views.

FIG. 1 shows a printing system comprising workstations 8A-8C connected to a network N. A reproduction apparatus 5 is available for a user working with one of the workstations 8A-8C and intending to send a print job comprising a set of documents from one of the workstations 8A-8C to the reproduction apparatus 5. The reproduction apparatus 5 is connected to the network N via a wired or wireless connection 6 and is configured to receive print jobs from the workstations 8A-8C. The reproduction apparatus 5 comprises a local user interface unit 2 configured to display print jobs, select a print job, edit settings of a print job and construct the composed digital image according to the present invention.

The composed digital image may also be constructed at one of the workstation 8A-8C or at a mobile device wired or wirelessly connected to the printing system. In another embodiment, a user interface is provided as a network site that is accessible with a browser on a client computer.

A control unit 3 is configured to store a queue of print jobs, to check whether or not the queue is empty and to submit a document from a queued print job to the print engine of the reproduction apparatus 5 in order to be printed. Image data of a print job are stored in the storage device 7 contained in the control unit 3 at least for the time period that the document is printed by the print engine and finished by a finisher. Image data may also be stored in memory (not shown) of at least one of the workstations 8A-8C. The composed digital image may also be stored in memory of the at least one of the workstations 8A-8C.

The shown reproduction apparatus 5 works up a first roll 1 of wound media having a length that is defined as a largest dimension of the media when unrolled. Media material may be paper, textile, overhead sheet material, plastic or any other kind of material or substrate suitable for winding up on a roll. The first roll 1 has been put in a holder. An end grain of the first roll 1 comprises a part 1a of the core of the roll 1 and a side part 1b of the media of the roll 1. In FIG. 1, the core of the first roll 1 and the side part of the media on the first roll 1 are visible. Individual digital images will be printed on media 9 given out of the first roll 1 by the reproduction apparatus 5 according to the composed digital image and according to the time line along the composed digital image. The media 9 enters the reproduction apparatus 5 on the left side and leaves as printed media 10 provided with individual digital images on the right side of the reproduction apparatus 5. The printed media 10 is wound up upon a second roll 4—similar to the first roll 1. The second roll 4 is loaded in another holder. The media on the second roll 4 is suitable for the individual digital images of a plurality of print jobs to be printed thereon.

Figure 2:
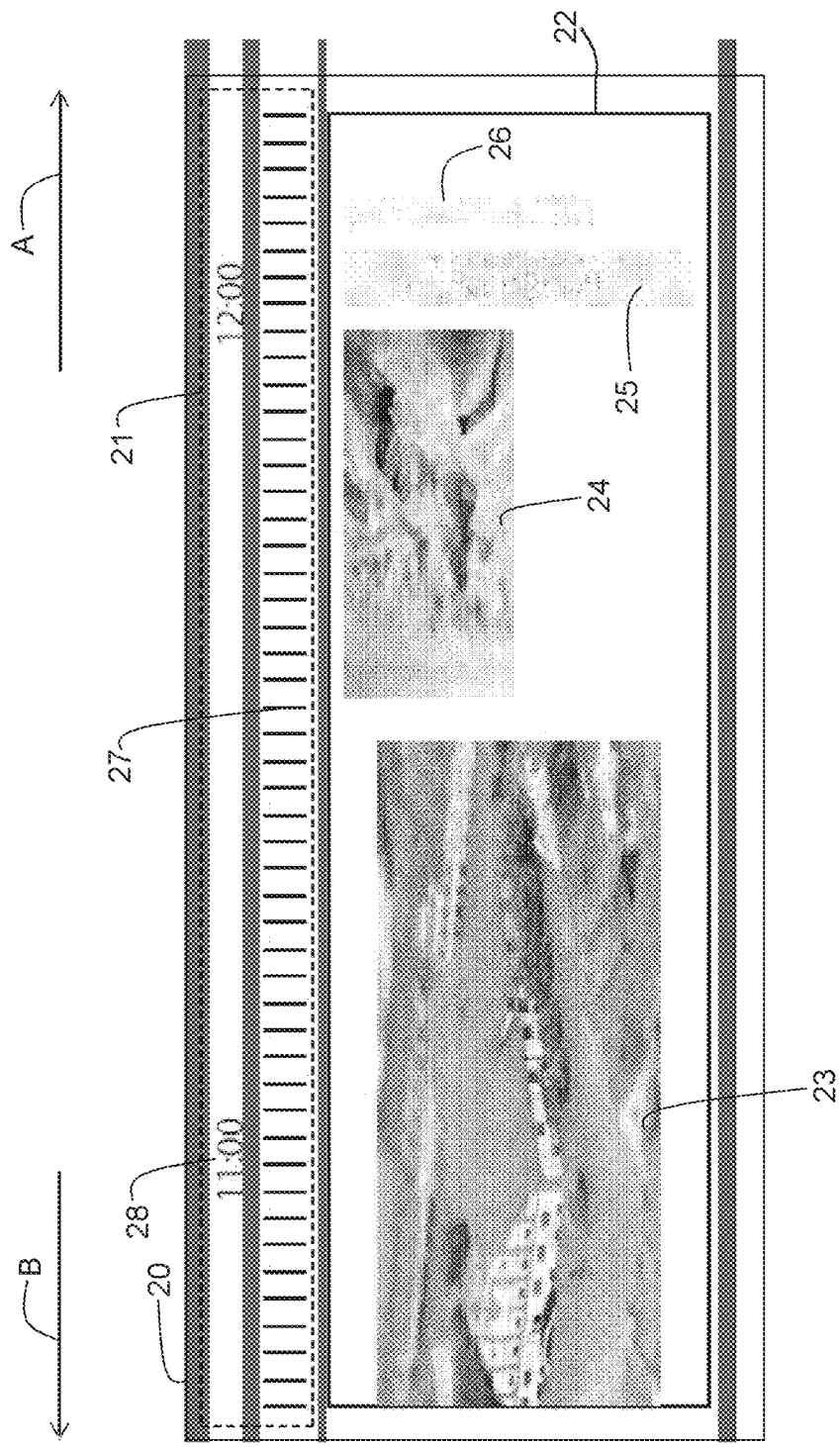
FIGS. 2-10 show constructed composed digital images with time lines according to the present invention on a user interface screen.

FIG. 2 shows a first constructed composed digital image 22 according to an embodiment of the present invention on a user interface screen 20. The constructed composed digital image 22 comprises individual digital images 23, 24, 25, 26 in a sequence as in which the individual digital images 23, 24, 25, 26 are going to be printed in time. Depending on the dimensions of the user interface screen 20, the dimensions of the individual digital images, and on the scaling factor applied to the constructed composed digital image 22, the number of displayed individual digital images may vary. A time line 21 is constructed along the constructed composed digital image 22. The time line 21 comprises tick marks 27 for every 2 minutes on the time line 21 and an hour indication 28 for each whole hour on the time line 21. Each individual digital image 23, 24, 25, 26 is displayed along the whole part of the time line 21 when it is intended to be printed or has been printed. For example, individual digital image 23 is going to be printed from 10:24 hours until 11:32 hours. The printing of the individual digital image 23 will take 01:08 hours.

Scrolling backward and forward through the individual digital images in the constructed composed digital image 22 may be achieved by scrolling signs (not shown) for backward and forward scrolling, respectively. If the user interface screen is a touch screen, forward scrolling is achieved by applying swiping gestures to the constructed composed digital image 22 or to the time line 21 in a first direction A corresponding to the length direction of the constructed composed digital image 22, and backward scrolling is achieved by applying swiping gestures to the constructed composed digital image 22 or to the time line 21 in a second direction B corresponding to the length direction of the constructed composed digital image 22.

In an embodiment, the user interface is provided with a zoom function for zooming in on or out of the first constructed composed digital image 22. The zoom function may be realized with a zoom in button and a zoom out button. In case of a touch screen, the zoom function may be realized by pinching by two fingers at the time line 21 or at the constructed composed digital image 22.

Figure 3:
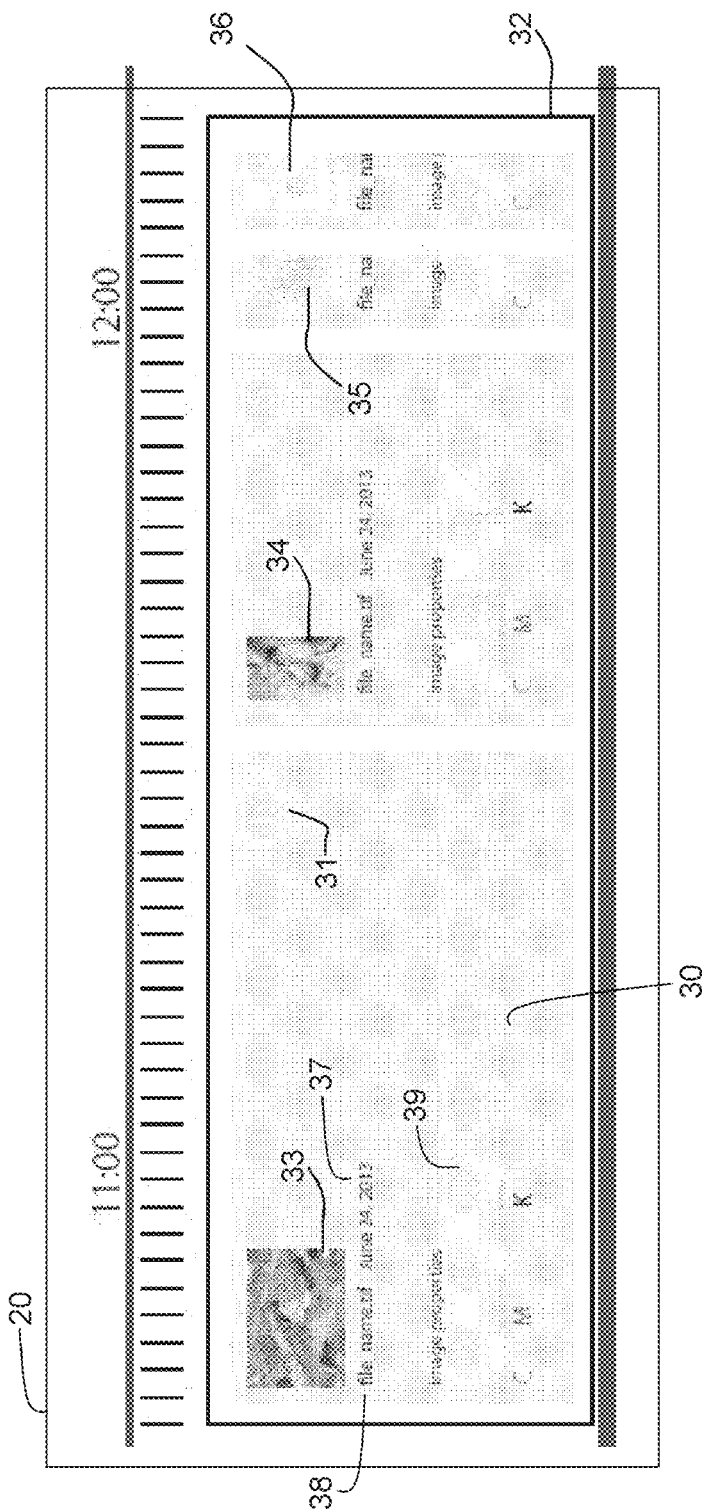

FIG. 3 shows a second constructed composed digital image 32 according to an embodiment of the present invention on the user interface screen 20. In the constructed composed digital image 22 of FIG. 2, the individual digital images 23, 24, 25, 26 are replaced by thumbnail images 33, 34, 35, 36 in order to construct the second composed digital image 32. Each thumbnail image 33, 34, 35, 36 is placed on a grey background digital image which is displayed along the whole part of the time line when the corresponding individual digital image is intended to be printed, is currently being printed or has been printed. For example, the thumbnail image 33 is placed on the grey background image 30. The background image may also comprise additional information such as the file name 38 of the individual digital image, the last amended date 37 of the individual digital image, the usage 39 of each color when printing the individual digital image and an absolute end time 31 when the printing of the individual digital image is completed. This second constructed composed digital image 32 is in particular useful when a zoom out function is applied to the time line by the operator, for example from a reach of 1.5 hour to for example 3 hours.

Figure 4:
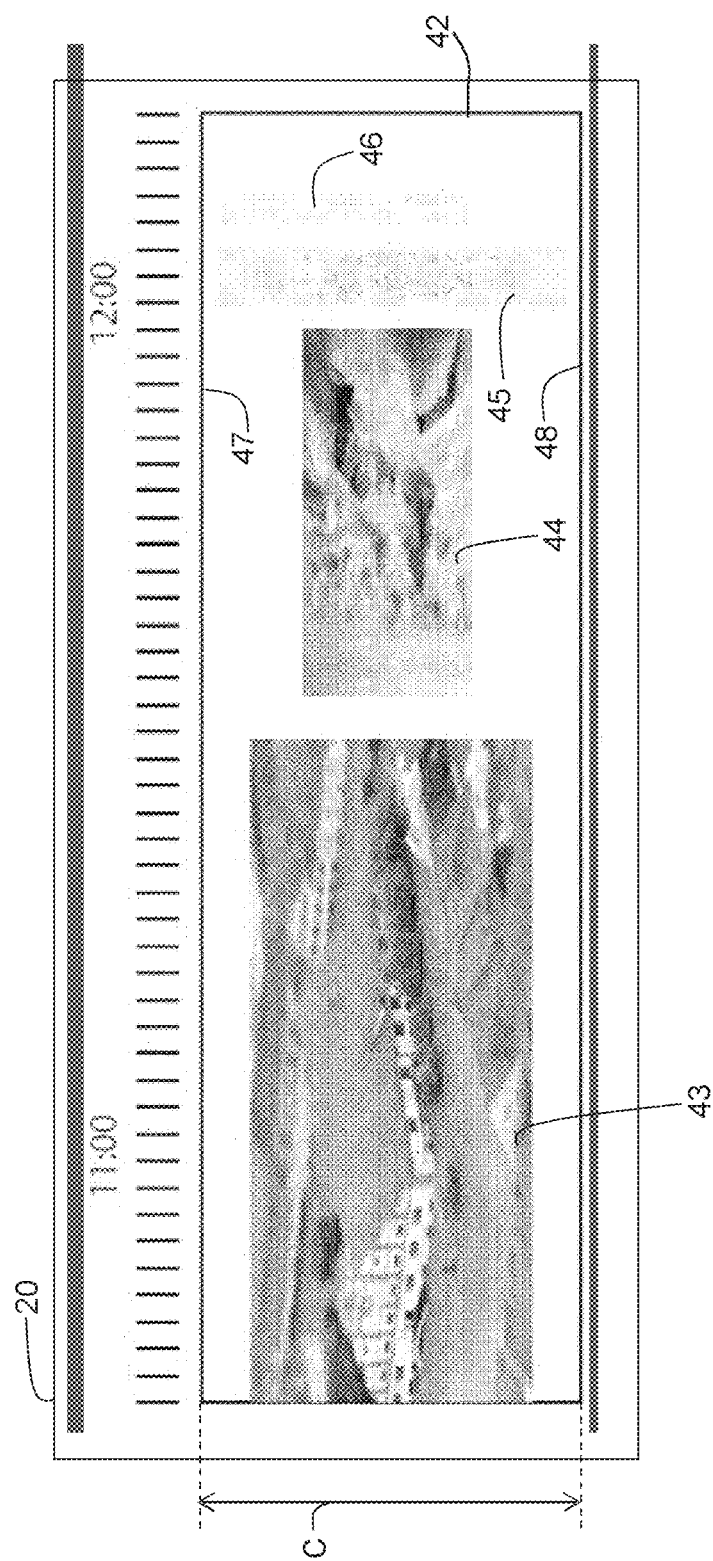

FIG. 4 shows a third constructed composed digital image 42 according to an embodiment of the present invention on user interface screen 20. The third constructed composed digital image 42 comprises four individual digital images 43, 44, 45, 46. In the third constructed composed digital image 42, each individual digital image 43, 44, 45, 46 is placed at a position with respect to the width of the corresponding composed digital image as indicated by a bidirectional arrow C, which position is in accordance with the position of the individual digital image on the roll when printed on the roll. In FIG. 4, the individual digital image 44 has been positioned in the middle between one edge 47 of the composed digital image 42 and an opposite edge 48 of the composed digital image 42. This is deviating from the positioning of the corresponding individual digital images 24 in the first constructed composed digital image 22 in FIG. 2, which is close to the one edge corresponding to the edge 47.

Figure 5:
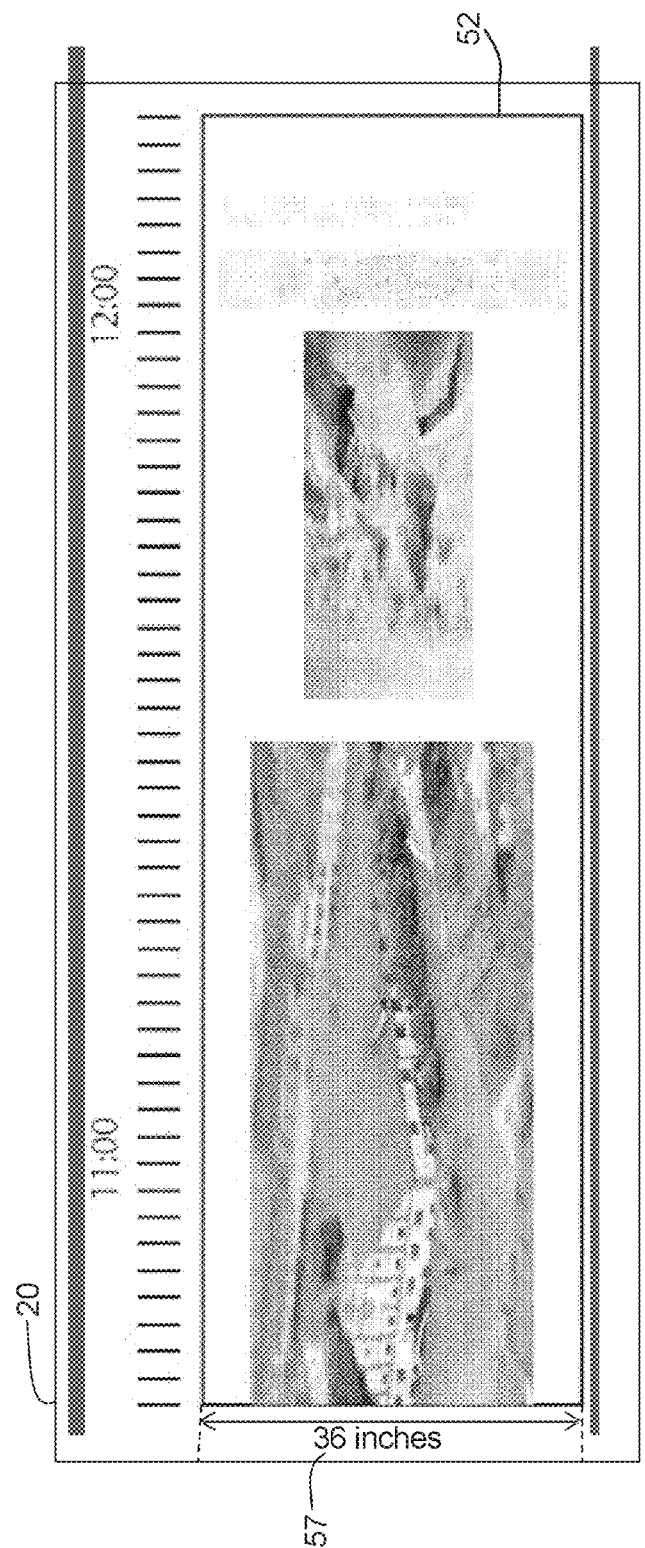

FIG. 5 shows a fourth constructed composed digital image 52 according to an embodiment of the present invention on user interface screen 20. Near the third constructed composed digital image 52, a numerical indication 57 of the width of the roll is displayed.

Figure 6:
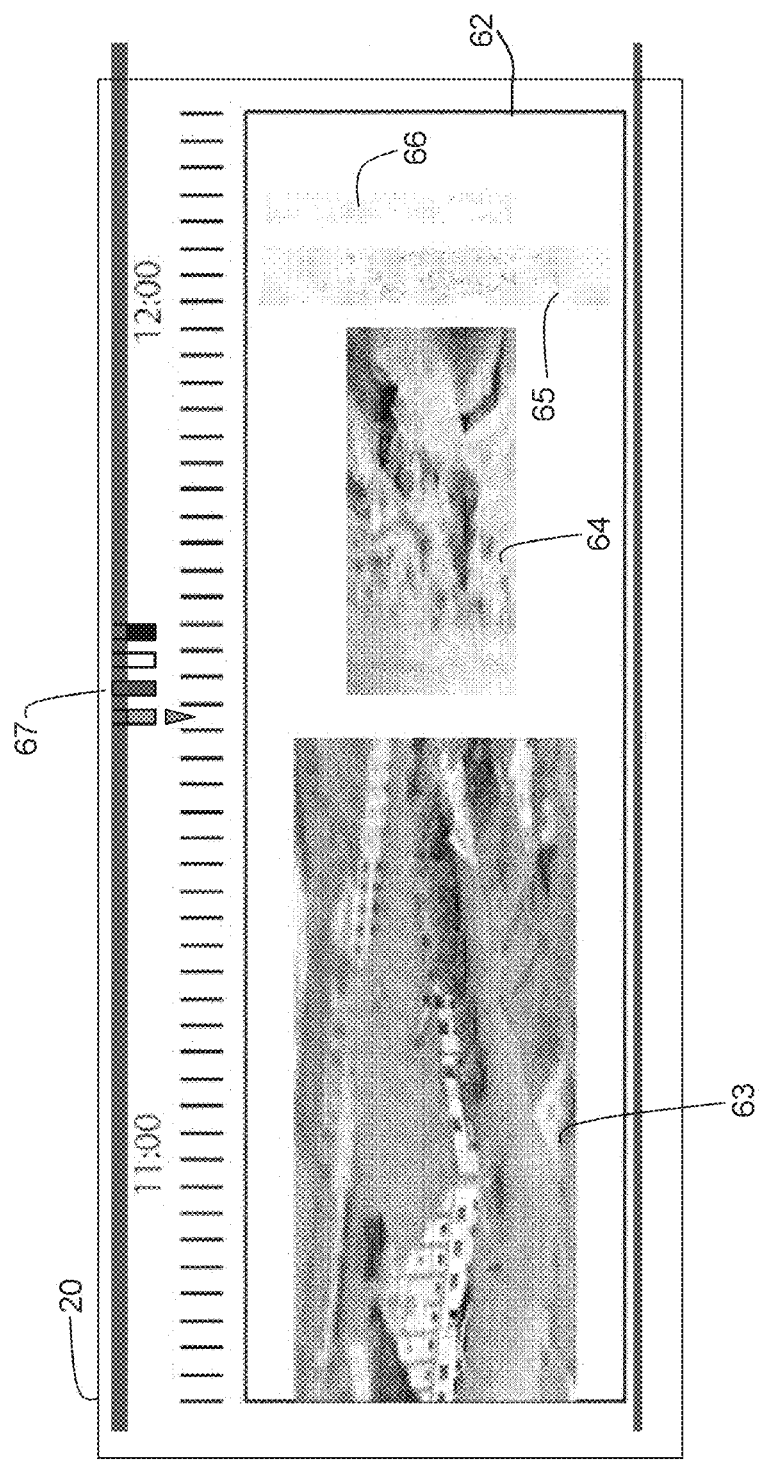

FIG. 6 shows a fifth constructed composed digital image 62 according to an embodiment of the present invention on user interface screen 20. The fifth constructed composed digital image 62 comprises four individual digital images 63, 64, 65, 66. An image item 67 is displayed along the time line at a time between printing of the individual digital image 63 and the printing of the individual digital image 64. The image item 67 corresponds to the levels of CMYK inks in the respective reservoirs in the printing system. The image item 67 indicates that the yellow ink reservoir should be refilled. The operator wants to know at what time the ink reservoir needs to be refilled so that the operator can work somewhere else and come back at the right moment to load a new reservoir or to fill the reservoir.

Figure 7:
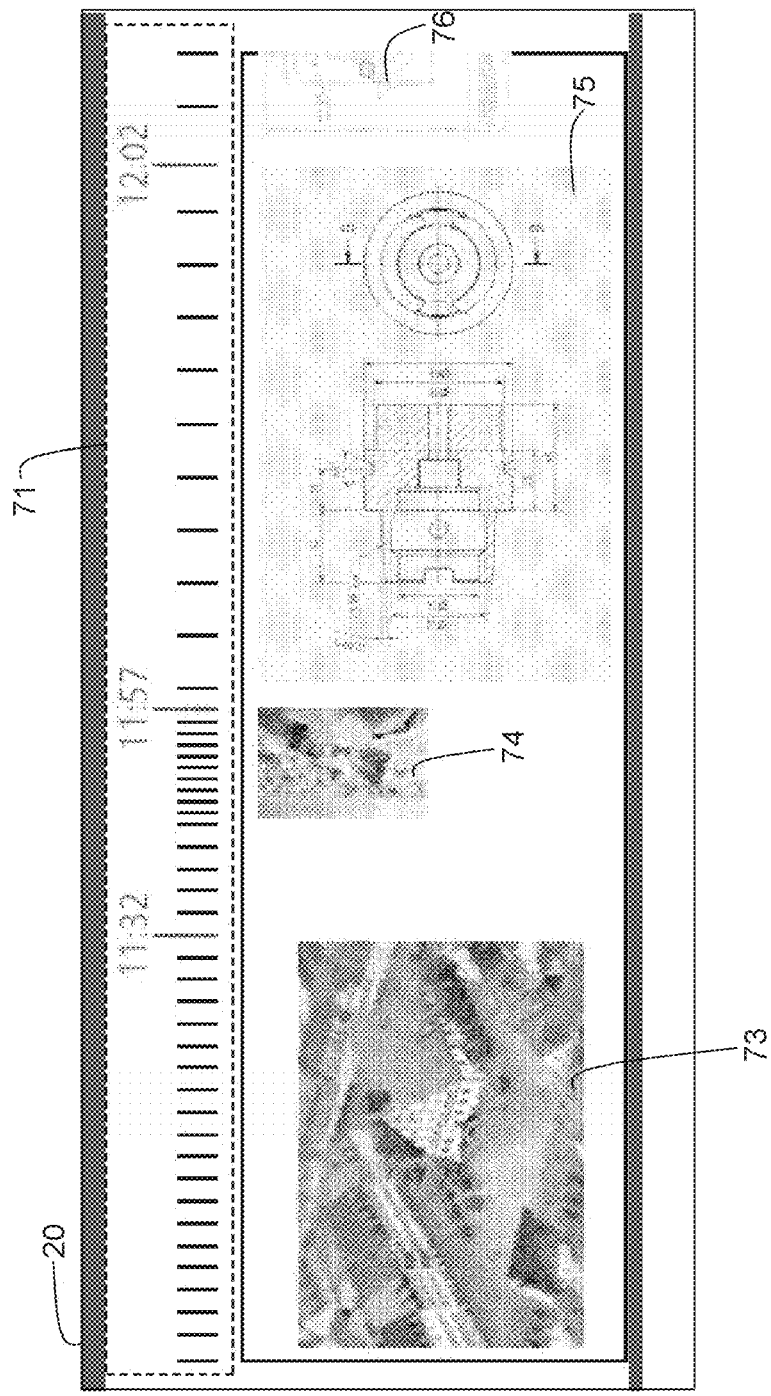

In FIG. 2, FIG. 3, FIG. 4, FIG. 5 and FIG. 6, the time line along each constructed composed digital image is displayed as a line of linear time. However, an embodiment will now be shown in FIG. 7, wherein the time line is displayed as a line of a-linear time. FIG. 7 shows a constructed composed digital image 72 comprising individual digital images 73, 74, 75, 76. Each individual digital image 73, 74, 75, 77 is displayed with an aspect ratio that is equal to the aspect ratio of the individual digital image when printed on the roll. The first individual digital image 73 is printed or intended to be printed at a first print velocity of the printing system. The second individual digital image 74 is printed or intended to be printed at a second print velocity of the printing system. Since more than one print velocity is involved in printing the individual digital images 73, 74, 75, 76, the time line receives an a-linear course. The second print velocity is slower than the first print velocity resulting in the higher density of the tick marks on the a-linear time line 71 during the print period of the second individual digital image 74 than the density of the tick marks during the print period of the first individual digital image 73. The third individual digital image 75 and the fourth individual digital image 76 are printed or intended to be printed at a third print velocity of the printing system. The third print velocity is faster than the first print velocity resulting in the smaller density of the tick marks on the a-linear time line 71 during the print period of the third individual digital image 75 and the print period of the fourth individual digital image 76 than the density of the tick marks during the print period of the first individual digital image 73. The color of the tick marks may vary per print velocity of the printing system. Instead of tick marks, other time indication items may be used like time bars or colored time bars.

The print velocity may also vary during the printing of an individual digital image. Print velocity may depend on the bitmap of the individual digital image, for example, during printing of a circle, the swathes may be short in the beginning and in the end of the printing of the circle, while the swathes may be large in the middle of the printing of the circle. In that case, the time line is also a-linear between the start time and the completion time of printing of the individual digital image.

The user interface screen 20 may comprise a switch button or two alternative buttons in order to be able to switch between a first view with a linear time line as shown in FIGS. 2, 3, 4, 5 and 6 and a second view with a conservation of the aspect ratios of the individual digital images in the composed digital image as shown in FIG. 7.

If the user interface screen 20 is a touch screen, a two-finger gesture may be allowed on the user interface screen 20.

When pinching on at least one individual digital image in the first view, the print velocity at which the at least one individual digital image is going to be printed will increase to the next higher available print velocity. The at least one individual digital image will be shrunk in the composed digital image accordingly.

When applying a stretching gesture to at least one individual digital image in the first view, the print velocity at which the at least one individual digital image is going to be printed will decrease to the next lower available print velocity. The at least one individual digital image will be enlarged in the composed digital image accordingly.

When pinching on a part of the time line corresponding to at least one individual digital image in the second view, the print velocity at which the at least one individual digital image is going to be printed will increase to the next higher available print velocity. The part of the time line that is pinched at, will be adapted accordingly.

When applying a stretching gesture to a part of the time line corresponding to at least one individual digital image in the second view, the print velocity at which the at least one individual digital image is going to be printed will decrease to the next lower available print velocity. The part of the time line that is stretched, will be adapted accordingly.

If the user interface screen 20 is not a touch screen, buttons or slide bars may be added to the user interface screen for increasing or decreasing the print velocity for an individual digital image to be printed on the roll. A warning may be displayed when increasing the print velocity, if such an increase has a negative influence on the print quality.

Figure 8:
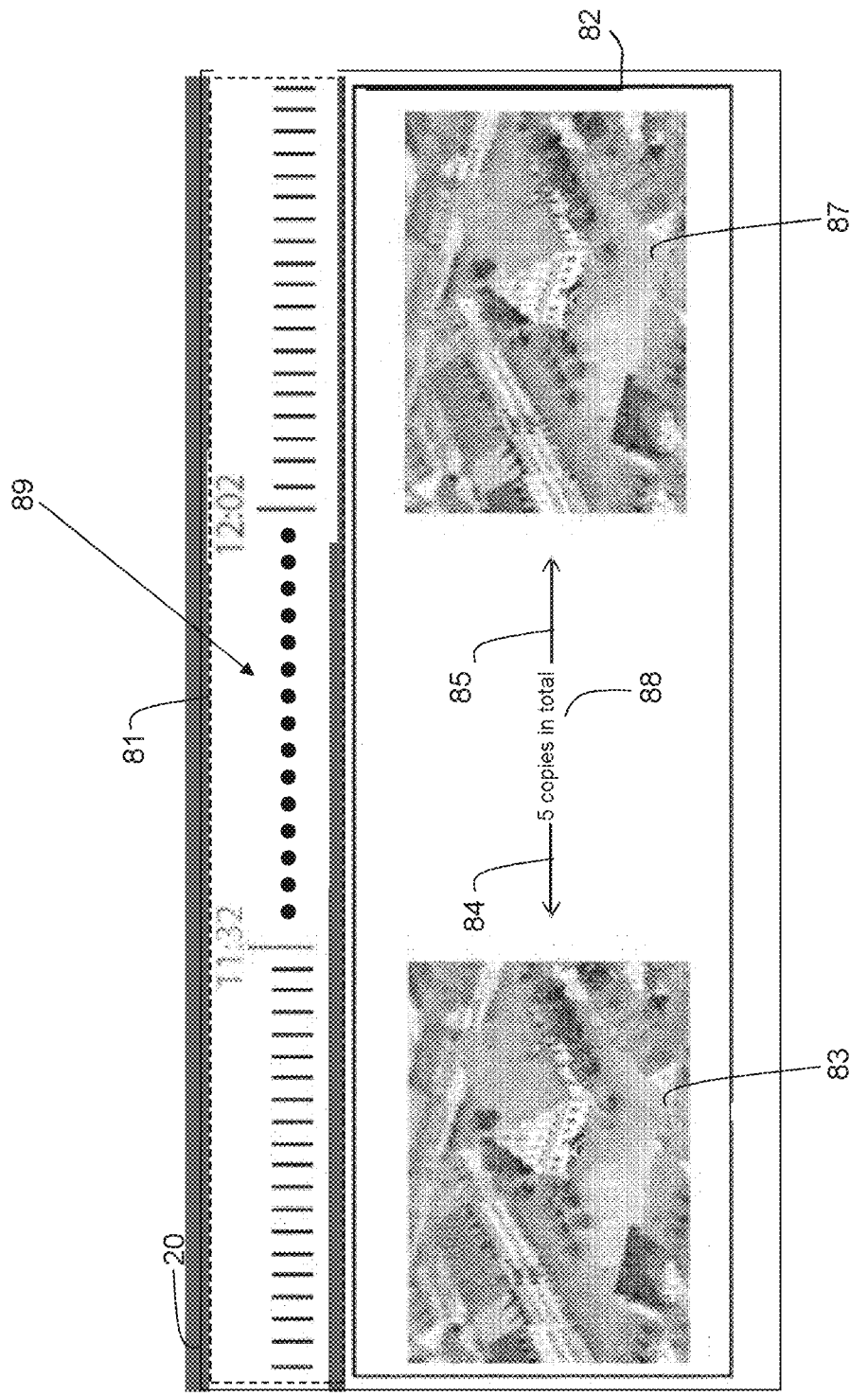

FIG. 8 shows a constructed composed digital image 82 comprising a number of individual digital images to be printed or which have been printed on the roll, wherein the individual digital images are the same. For example, a customer wants to have five printed posters of the same image. In order to ease scrolling through the number of the same images in the constructed composed digital image 82, only the first image 83 and the last image 87 are shown, while the intermediate number of images are replaced by continuation symbols 84, 85 in combination with an indication 88 of the number of same copies to be printed. The time line 81 is adapted accordingly. For example, in the time line 81 appears a discontinuity or a gap 89. A gap like the gap 89 in FIG. 8 may also occur when a maintenance action is scheduled by the printing system during printing on the roll.

Figure 9:
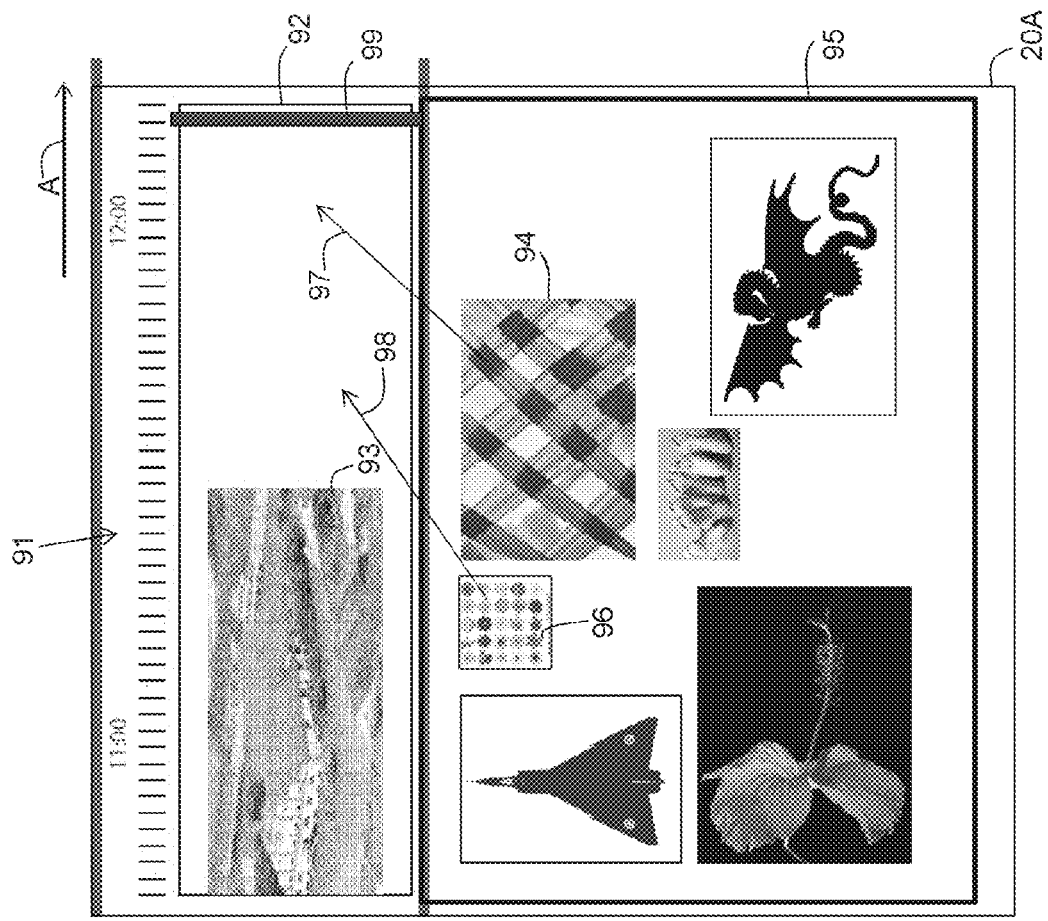

FIG. 9 shows a user interface screen 20A provided with the constructed composed digital image 92, a constructed time line 91 according to an embodiment of the present invention, and a window 95 comprising a plurality of individual digital images. The window 95 may represent a particular part of the memory such as a hot folder or an image file directory. Each of the plurality of individual digital images may be selected and dragged and dropped on the composed digital image 92. A first individual digital image 96 may be added to the composed digital image 92 by dragging and dropping the first individual digital image 96 onto a place at the composed digital image 92 indicated by a first arrow 98. A second individual digital image 94 may be added to the composed digital image 92 by dragging and dropping the second individual digital image 94 onto a place at the composed digital image 92 indicated by a second arrow 97. In FIG. 9, only the two individual digital images 94, 96 may be added to the composed digital image 92, since an end-of-roll situation is visible in the composed digital image 92 indicated by a red bar 99. The space left on the roll is only large enough for the two individual digital images 94, 96 to be added.

Such an end-of-roll indication as the red bar 99 may also be envisioned when scrolling to the uttermost right side of the composed digital image representing the roll in FIGS. 2-8. A start-of-roll indication may also be envisioned when scrolling to the uttermost left side of the composed digital image in FIGS. 2-10.

Instead of dragging and dropping an image on the user interface screen 20A, which is a touch screen, the image may be selected by a mouse and moved by means of the mouse to the desired place on the composed digital image 92. An image may also be dragged and dropped onto a place between two images already placed on the composed digital image 92. In this way, the sequence order of images on the composed digital image 92 may be changed. This is allowed as long as the two images on the composed digital image 92 are not yet printed. The images on the composed digital image 92 may also be moved as long as they are not yet printed on the roll.

Figure 10:
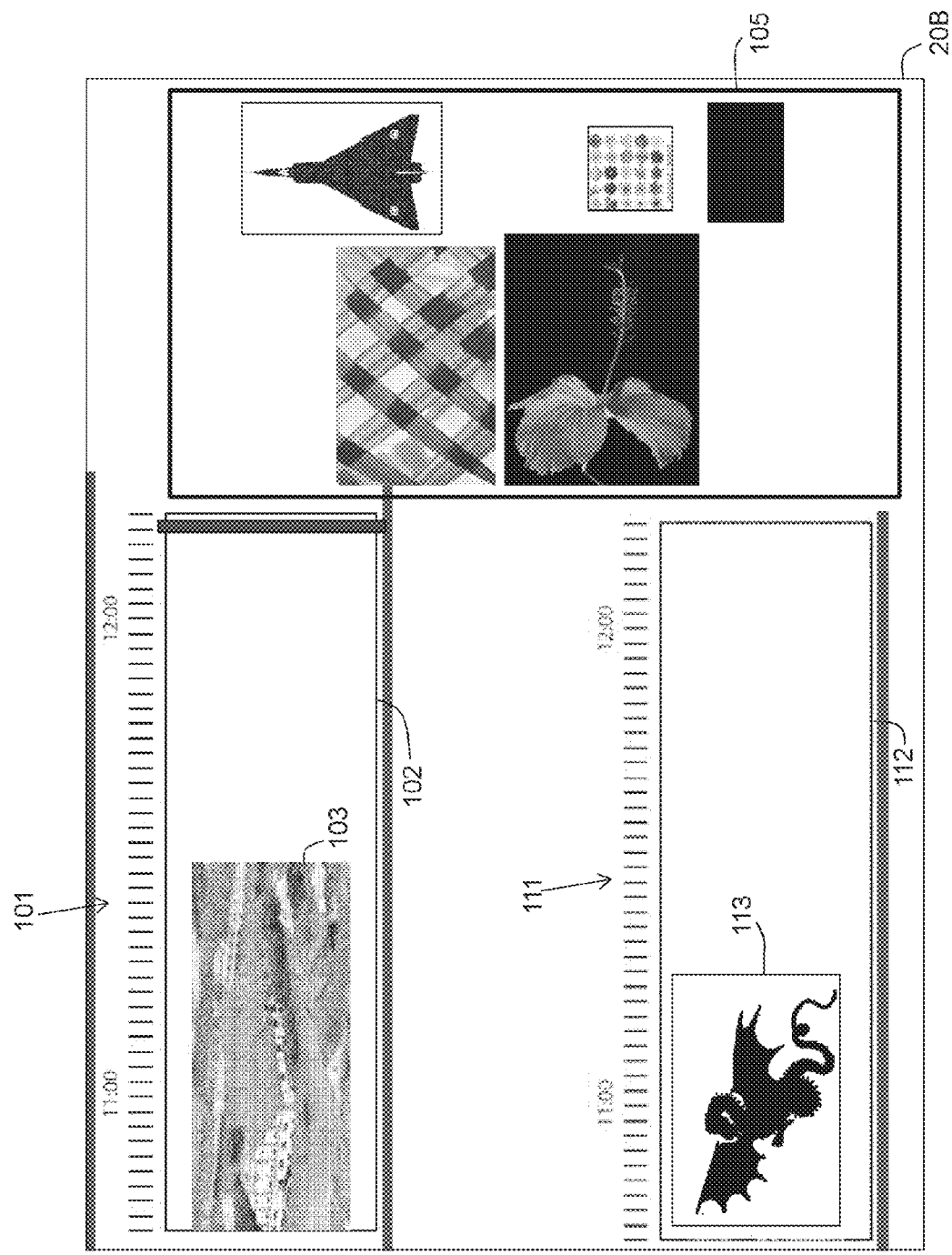

FIG. 10 shows a user interface screen 20B provided with a first constructed composed digital image 102, a first constructed time line 101, a second constructed composed digital image 112, a second constructed time line 111 and a window 105 comprising a plurality of individual digital images. The first composed digital image 102 represents a first roll to be printed upon. The second composed digital image 112 represents a second roll to be printed upon. The first and second roll may be loaded on the same printing system or on different printing systems. The first time line 101 and the second time line 111 may be combined into one time line. In this way, the operator or user may create a sequence with the constructed composed digital images 102, 112. The application shows how the media will be printed and with which sequence. The user or operator is able to see when ink will be missing and when a new media roll needs to be loaded again. The window 105 may be split into two windows, for example, one window corresponding to the first composed digital image 102 and another window corresponding to the second composed digital image 112. Each of the plurality of individual digital images in the window 105 may be selected and dragged and dropped on the first composed digital image 102 or on the second composed digital image 112. An individual digital image 103 placed on the first composed digital image 102 may be dragged and dropped onto the second composed digital image 112. An individual digital image 113 placed on the second composed digital image 112 may be dragged and dropped onto the second composed digital image 102. An individual digital image 103 placed on the first composed digital image 102 may be dragged and dropped back to the window 105. An individual digital image 113 placed on the second composed digital image 112 may be dragged and dropped onto the window 105.

In a further embodiment to the embodiments shown in FIGS. 2-10, a distance line is displayed along the composed digital image. The distance line shows at which distance from the beginning of the roll each individual digital image is located when printed. The distance line may have an a-linear format according to the embodiments shown in FIGS. 2-6. The distance line may have a linear format according to the embodiments shown in FIGS. 7-8.

Figure 11:
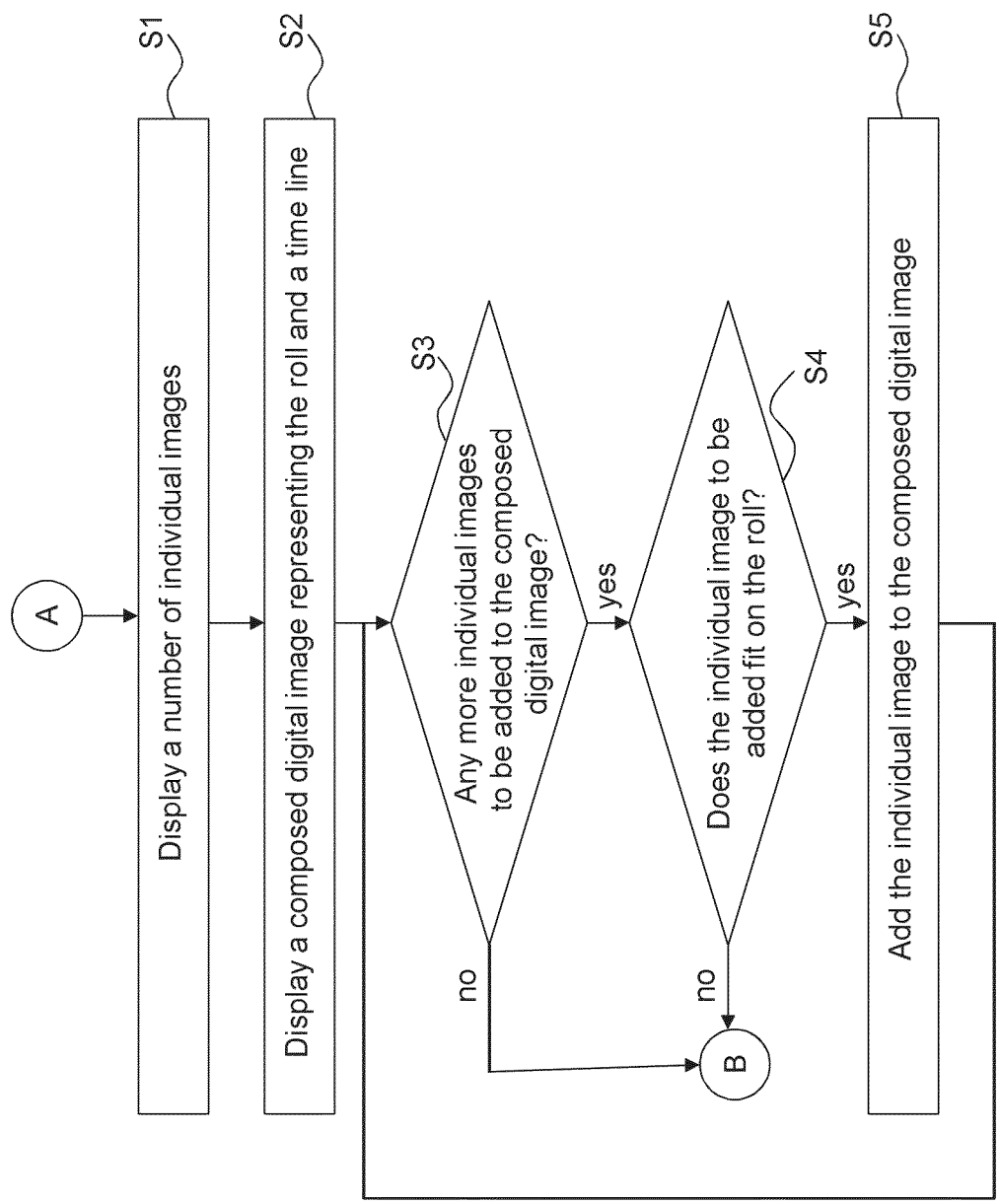
FIG. 11 is a flow diagram of the method according to the present invention.

FIG. 11 is a flow diagram of the method according to an embodiment of the present invention. From a starting point A, a first step S1 is reached.

According to the first step S1, a number of individual digital images is displayed.

According to a second step S2, a composed digital image representing the roll is displayed and a time line is displayed along the composed digital image.

According to a third step S3, it is checked if there are any more individual digital images to be added to the composed digital image. If not, the method ends in end point B.

If there is an individual digital image still to be added, the method proceeds with a fourth step S4.

According to the fourth step S4, it is checked if the individual digital image to be added fits on the roll. If not, the method ends in end point B.

If the individual digital image to be added fits on the roll, the method proceeds with a fifth step S5.

According to the fifth step S5, the individual digital image is added to the composed digital image. The method returns to the third step S3.

In case there are the same individual digital images which have to be added to the composed digital image, for example 5 copies of a particular digital image, the method comprises additional steps of asking for the number of copies and checking if the total number of copies fits on the roll. The user may be asked if the number of copies may be split into two parts: one part which fits on the roll and a second part which has to be printed on another roll. The number of copies may be asked for via an entry box on the user interface screen or a pop-up box on the user interface screen.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for planning a plurality of individual digital images to be printed on a roll of media, the method comprising the steps of:
   constructing a composed digital image representing the roll and comprising a plurality of representations of the individual digital images to be printed on the roll in a sequence order corresponding to a time sequence order of printing the plurality of individual digital images on the roll;
   constructing a time line along the composed digital image, the time line indicating a start time and/or a completion time and/or a time duration of the printing of an image of the plurality of individual digital images on the roll;
   displaying at least a part of the composed digital image on the user interface, wherein the composed digital image is scrollable on the user interface in order to scroll through the plurality of representations of the individual digital images, and each displayed representation of an individual digital image of the composed digital image is displayed wholly along a part of the time line, the part of the time line starting at the start time of printing of the individual digital image on the roll and ending at the completion time of printing of the individual digital image on the roll; and
   displaying an image item between two consecutive representations of the plurality of individual digital images along the time line, the image item indicating a user event for maintenance of a printing system by which the roll is printed.

2. The method according to claim 1, wherein the representation of an individual digital image of the plurality of representations comprises an image of the individual digital image.

3. The method according to claim 1, wherein the step of constructing the composed digital image comprises the steps of:
   displaying the plurality of individual digital images on the user interface;
   displaying the composed digital image under construction on the user interface;
   selecting an image from the plurality of individual digital images on the user interface;
   dragging and dropping the selected image onto the composed digital image on the user interface;
   adding a representation of the selected image to the composed digital image; and
   displaying the representation of the selected image in the composed digital image on the user interface screen.

4. The method according to claim 1, further comprising the steps of:
   zooming out of the composed digital image; and
   constructing the composed digital image by changing a representation of an individual digital image of the composed digital image into a representation comprising a thumbnail image of the individual digital image.

5. The method according to claim 1, further comprising the step of placing a representation of an individual digital image of the composed digital image at a position with respect to the width of composed digital image, the position being in accordance with the position of the individual digital image on the roll with respect to the width of the roll when printed on the roll.

6. The method according to claim 1, further comprising the step of dragging and dropping the image item between two other consecutive representations of individual digital images in the composed digital image.

7. The method according to claim 1, further comprising the step of displaying the time line as a line of linear time.

8. The method according to claim 7, further comprising the step of shrinking or stretching the representations of the individual digital images in the length direction of the composed image in accordance with a print velocity with which the individual digital images are printed, in case of printing on the roll by means of more than one print velocity.

9. The method according to claim 2, wherein the aspect ratio of each displayed representation of an individual digital image in the composed digital image is equal to the aspect ratio of the individual digital image when printed on the roll, and the time line has an a-linear course due to a use of more than one print velocity in printing the individual digital images.

10. The method according to claim 1, further comprising the step of reordering the representations of the plurality of individual digital images on the composed digital image that have not yet been printed on the roll.

11. The method according to claim 1, further comprising the step of applying the method to a further roll.

12. The method according to claim 11, further comprising the step of dragging and dropping an image of the plurality of individual digital images, which image has not yet been printed, on the displayed composed digital image of the further roll in order to print the image on the further roll.

13. A non-transitory computer readable medium comprising computer executable program code configured to instruct a computer to perform the method according claim 1.

14. A printing system comprising:
   a print engine to print a plurality of individual digital images on a roll of media;
   a user interface for displaying a plurality of representations of the individual digital images; and
   a control unit configured to control the printing process and to control data transfer to the user interface,
   wherein the control unit comprises:
      a first constructing device configured to construct a composed digital image representing the roll and comprising the plurality of representations of the individual digital images to be printed on the roll in a sequence order corresponding to the time sequence order of printing the plurality of individual digital images on the roll, the composed digital image being scrollable on the user interface in order to scroll through the plurality of representations of the individual digital images;
      a second constructing device configured to construct a time line comprised in the composed digital image, the time line indicating a start time and/or a completion time and/or a time duration of the printing of an image of the plurality of individual digital images on the roll; and
      a determining device configured to determine at least a part of the plurality of individual digital images of the composed digital image and the corresponding part of the time line to be displayed on the user interface,
   wherein the construction of the composed digital image by the first constructing device and the construction of the time line by the second constructing device are such that each displayed representation of an individual digital image of the composed digital image is displayed wholly along a part of the time line, the part of the time line starting at the start time of printing of the individual digital image on the roll and ending at the completion time of printing of the individual digital image on the roll, and wherein the control unit is configured to display an image item between two consecutive representations of the plurality of individual digital images along the time line, the image item indicating a user event for maintenance of the printing system.

15. The printing system according to claim 14, wherein the printing system is a roll-to-roll printing system.

* * * * *